(12) United States Patent
Cellucci et al.

(10) Patent No.: US 11,619,700 B2
(45) Date of Patent: Apr. 4, 2023

(54) RETROSPECTIVE INTERFEROMETRY DIRECTION FINDING

(71) Applicant: Parsons Corporation, Centreville, VA (US)

(72) Inventors: Richard Cellucci, Fredericksburg, VA (US); Marc Shadish, Spotsylvania, VA (US); Joseph Payton, Centreville, VA (US); Nicholas E. Ortyl, III, Bedford, MA (US)

(73) Assignee: PARSONS CORPORATION, Centreville, VA (US)

( * ) Notice: Subject to any disclaimer, the term of this patent is extended or adjusted under 35 U.S.C. 154(b) by 103 days.

(21) Appl. No.: 17/221,982

(22) Filed: Apr. 5, 2021

(65) Prior Publication Data
US 2021/0311156 A1 Oct. 7, 2021

Related U.S. Application Data

(60) Provisional application No. 63/006,571, filed on Apr. 7, 2020.

(51) Int. Cl.
*G01S 5/04* (2006.01)
*G01S 3/12* (2006.01)
(Continued)

(52) U.S. Cl.
CPC .................. *G01S 3/12* (2013.01); *G01S 3/14* (2013.01); *G01S 3/043* (2013.01); *G01S 3/72* (2013.01)

(58) Field of Classification Search
CPC .............. G01S 3/12; G01S 3/14; G01S 3/043; G01S 3/72
(Continued)

(56) References Cited

U.S. PATENT DOCUMENTS 4,380,010 A * 4/1983 Krajewski ................. G01S 3/14
342/368
5,365,592 A 11/1994 Horner et al.
(Continued)

FOREIGN PATENT DOCUMENTS

CN 201476875 5/2010
CN 202794534 3/2013
(Continued)

OTHER PUBLICATIONS

Wassie Dereje Assefa et al., "An Agile Multi-Node Multi-Antenna Wireless Channel Sounding System", IEEE Access, vol. 7, (Jan. 31, 2019), pp. 17503-17516.
(Continued)

*Primary Examiner* — Chuong P Nguyen
(74) *Attorney, Agent, or Firm* — Martensen IP; Michael C. Martensen

(57) ABSTRACT

Using captured and stored wideband historical radio frequency data bearing information to the source of a signal of interest achieved using as few as two receivers and a plurality of commutating antennas. Wideband IQ data streams are received at two or more receivers and stored for later analysis. A first receiver is coupled to a reference antenna and a second receiver is commutatively coupled to a plurality of commutating antennas. Later, streams of wideband IQ data are retrieved for a select period of time and synchronized. From these streams a signal of interest identified and synchronously sampled over an acquisition interval by each receiver. Phase differences of the signal at each of the plurality commutating antennas is measured enabling a determination of the bearing to the common signal of interest.

18 Claims, 13 Drawing Sheets

(51) Int. Cl.
*G01S 3/14* (2006.01)
*G01S 3/72* (2006.01)
*G01S 3/04* (2006.01)

(58) Field of Classification Search
USPC .................................................. 342/442, 417
See application file for complete search history.

(56) References Cited

U.S. PATENT DOCUMENTS

| | | | |
|---|---|---|---|
| 5,426,438 A | 6/1995 | Peavey et al. | |
| 5,436,847 A | 7/1995 | Schroer et al. | |
| 5,867,535 A | 2/1999 | Phillips et al. | |
| 6,078,736 A | 6/2000 | Guccione | |
| 6,255,991 B1* | 7/2001 | Hedin | H01Q 21/293 342/442 |
| 6,539,438 B1 | 3/2003 | Ledzius et al. | |
| 6,700,536 B1* | 3/2004 | Wiegand | G01S 3/50 342/417 |
| 6,874,145 B1 | 3/2005 | Ye | |
| 6,898,235 B1 | 5/2005 | Carlin et al. | |
| 7,210,121 B2 | 4/2007 | Xia et al. | |
| 7,317,761 B2 | 1/2008 | Lozhkin | |
| 7,320,062 B2 | 1/2008 | Master et al. | |
| 7,349,503 B2 | 3/2008 | Husted et al. | |
| 7,366,246 B2 | 4/2008 | Walker et al. | |
| 7,369,485 B2 | 5/2008 | Halford et al. | |
| 7,403,505 B2 | 7/2008 | Yoon et al. | |
| 7,430,257 B1 | 9/2008 | Shattil | |
| RE41,130 E | 2/2010 | Fette et al. | |
| 7,684,467 B2 | 3/2010 | Li et al. | |
| 7,848,719 B2* | 12/2010 | Krishnaswamy | H03L 7/087 375/372 |
| 7,929,937 B2 | 4/2011 | Koivunen et al. | |
| 7,937,601 B2 | 5/2011 | Bakker et al. | |
| 7,987,151 B2 | 7/2011 | Schott et al. | |
| 7,987,432 B1 | 7/2011 | Grechishkin et al. | |
| 8,086,836 B2 | 12/2011 | Chong et al. | |
| 8,364,946 B2 | 1/2013 | Ishebabi | |
| 8,400,357 B2* | 3/2013 | Fukagawa | G01S 3/46 342/423 |
| 8,412,111 B2 | 4/2013 | Talwar et al. | |
| 8,615,206 B2 | 12/2013 | Meng | |
| 8,677,378 B2 | 3/2014 | Murotake et al. | |
| 8,763,004 B1 | 6/2014 | Callahan, III | |
| 8,850,411 B2 | 9/2014 | Kelem et al. | |
| 9,606,213 B2* | 3/2017 | Meiman | G01S 3/46 |
| 9,663,659 B1 | 5/2017 | Harlow | |
| 9,958,526 B2* | 5/2018 | Kumar | G01S 5/0273 |
| 10,969,458 B1* | 4/2021 | Clymer | G01S 3/06 |
| 2003/0011514 A1 | 1/2003 | Krichofer et al. | |
| 2004/0093595 A1 | 5/2004 | Bilange | |
| 2005/0120346 A1 | 6/2005 | Sprigg | |
| 2005/0125513 A1 | 6/2005 | Sin-Ling Lam et al. | |
| 2006/0195840 A1 | 8/2006 | Sundarrajan et al. | |
| 2006/0218549 A1 | 9/2006 | Hsu et al. | |
| 2006/0248445 A1 | 11/2006 | Rogerson et al. | |
| 2007/0256073 A1 | 11/2007 | Troung et al. | |
| 2008/0040507 A1 | 2/2008 | Hsu et al. | |
| 2008/0134143 A1 | 6/2008 | Hoerentrup et al. | |
| 2008/0147705 A1 | 6/2008 | Bansal et al. | |
| 2008/0198948 A1 | 8/2008 | Tang | |
| 2008/0318544 A1 | 12/2008 | Wang et al. | |
| 2009/0031396 A1 | 1/2009 | Jung et al. | |
| 2009/0119773 A1 | 5/2009 | D'Amore | |
| 2009/0129493 A1 | 5/2009 | Zhang et al. | |
| 2009/0215390 A1 | 8/2009 | Ku et al. | |
| 2009/0279626 A1 | 11/2009 | Wang | |
| 2009/0287894 A1 | 11/2009 | Renno | |
| 2009/0290552 A1 | 11/2009 | Bertorelle | |
| 2009/0307540 A1 | 12/2009 | Razazian et al. | |
| 2009/0313620 A1 | 12/2009 | Sedukhin et al. | |
| 2010/0086074 A1 | 4/2010 | Chen et al. | |
| 2010/0138501 A1 | 6/2010 | Clinton et al. | |
| 2010/0142643 A1 | 6/2010 | Ueda | |
| 2010/0202574 A1 | 8/2010 | Chen et al. | |
| 2010/0205274 A1 | 8/2010 | Gharabally et al. | |
| 2010/0226454 A1 | 9/2010 | Bliss et al. | |
| 2010/0235261 A1 | 9/2010 | Lloyd et al. | |
| 2010/0306773 A1 | 12/2010 | Lee et al. | |
| 2010/0319051 A1 | 12/2010 | Bafna et al. | |
| 2011/0296412 A1 | 12/2011 | Banga et al. | |
| 2012/0023194 A1 | 1/2012 | Ruiz-Velasco et al. | |
| 2012/0030672 A1 | 2/2012 | Zygmuntowicz et al. | |
| 2012/0036552 A1 | 2/2012 | Dare et al. | |
| 2012/0054184 A1 | 3/2012 | Masud et al. | |
| 2012/0066679 A1 | 3/2012 | Pappas et al. | |
| 2012/0151479 A1 | 6/2012 | Kothari | |
| 2012/0303695 A1 | 11/2012 | Michel et al. | |
| 2013/0061222 A1 | 3/2013 | Hwang et al. | |
| 2013/0067089 A1 | 3/2013 | Synytskyy et al. | |
| 2013/0102254 A1 | 4/2013 | Cyzs et al. | |
| 2013/0111328 A1 | 5/2013 | Khanna et al. | |
| 2013/0167135 A1 | 6/2013 | Neumann et al. | |
| 2013/0181867 A1 | 7/2013 | Sturdivant et al. | |
| 2013/0191495 A1 | 7/2013 | Almstrand et al. | |
| 2013/0198734 A1 | 8/2013 | Biswas et al. | |
| 2013/0212559 A1 | 8/2013 | Lehtimaki et al. | |
| 2013/0227565 A1 | 8/2013 | Lee et al. | |
| 2013/0283400 A1 | 10/2013 | Schneider et al. | |
| 2013/0308940 A1 | 11/2013 | Kpodzo et al. | |
| 2013/0326499 A1 | 12/2013 | Mowatt et al. | |
| 2013/0332991 A1 | 12/2013 | Rivera | |
| 2013/0346965 A1 | 12/2013 | Conlan et al. | |
| 2014/0007048 A1 | 1/2014 | Qureshi et al. | |
| 2014/0007122 A1 | 1/2014 | Udeshi et al. | |
| 2014/0072947 A1 | 3/2014 | Boguraev | |
| 2014/0079235 A1 | 3/2014 | Lyons | |
| 2014/0269374 A1 | 9/2014 | Abdelmonem et al. | |
| 2015/0270917 A1 | 9/2015 | Roman et al. | |
| 2015/0356431 A1 | 12/2015 | Saxena | |
| 2017/0011625 A1 | 1/2017 | Stelzig et al. | |
| 2017/0094527 A1 | 3/2017 | Shattil et al. | |
| 2018/0014217 A1 | 1/2018 | Kleinbeck et al. | |
| 2019/0346533 A1* | 11/2019 | Robinson | G01S 3/50 |
| 2020/0162559 A1 | 5/2020 | Sustaeta et al. | |
| 2020/0242516 A1 | 7/2020 | Dhingra et al. | |
| 2021/0098881 A1* | 4/2021 | McCorkle | G01S 3/10 |
| 2022/0050162 A1* | 2/2022 | Zand | H04W 4/026 |

FOREIGN PATENT DOCUMENTS

| | | |
|---|---|---|
| CN | 102158242 | 7/2013 |
| DE | 102007034851 | 1/2009 |
| EP | 3065324 A1 | 9/2016 |
| GB | 2344729 A | 6/2000 |

OTHER PUBLICATIONS

Stanciu Valentin et al., "Data Collection for Spectrum Sensing Algorithms Based on USRP", 2014 10th International Conferfence on Communications (COMM), IEE, (May 29, 2014), pp. 1-4.

Patent Cooperation Treaty Application No. PCT/US2021/014161, International Search Report and Written Opinion, Applicant Parsons Corporation, dated May 10, 2021.

Patent Cooperation Treaty Application No. PCT/US2021/027640, International Search Report and Written Opinion, Applicant Parsons Corporation, dated Jul. 28, 2021.

Patent Cooperation Treaty Application No. PCT/US2021/026130, International Search Report and Written Opinion, Applicant Parsons Corporation, dated Jun. 18, 2021.

Axell, Erik, et al., "Optimal and Sub-Optimal Spectrum Sensing of OFDM Signals in Known and Unknown Noise Variance." IEEE Journal on Selected Areas in Communications, vol. 29, No. 2, Feb. 2011, pp. 290-304.

Bokharaiee, Simin, "Blind Spectrum Sensing for OFDM-Based Cognitive Radio Systems." IEEE Transactions on Vehicular Technology, vol. 60, No. 3, Mar. 2011, pp. 858-871.

Chen, Hou-Shin, et al., "Spectrum Sensing for OFDM Systems Employing Pilot Tones," IEEE Transactions on Wireless Communications, vol. 8, No. 12, Dec. 2009, pp. 5862-5870.

(56) References Cited

OTHER PUBLICATIONS

Rui, Yun, "Frequency Domain Discrete Fourier Transform Spread Generalized Multi-Carrier System and Its Performance Analysis," Computer Communications 32 (2009), pp. 456-464.

Ehringer, "The Dalvik Virtual Machine Architecture", 8 pages, (Mar. 2010).

Li, et al., "XVM: A Bridge Between XML Data and Its Behavior", pp. 155-163, (May 17-22, 2004).

Slade, et al., "Reconfigurable Computing Application Frameworks," Brigham Young University, 10 pages (2003).

Boano, et al., "Controllable Radio Interference for Experimental and Testing Purposes in Wireless Sensor Networks," www.soda.swedish-ict.se, 8 pages (Apr. 20, 2015).

Spirent Communications of Eatontown, L.P., "Spirent Communications TAS 4600A Noise and Interference Emulator Operations Manual," 168 pages (2001).

ITU, "Radio Regulations of the International Telecommunication Union Radiocommunication Sector (ITU-R) (2012 Ed.)", 432 pages (2012).

Al-Khateeb et al. "Recurring and Novel Class Detection Using Class-Based Ensemble for Evolving Data Stream", IEEE Transactions on Knowlede and Data Engineering, IEEE Service Center, Los Alamitos, CA, US, vol. 28, No. 10, Oct. 1, 2016, pp. 2752-2764.

Patent Cooperation Treaty Application No. PCT/US2020/046808, International Search Report and Written Opinion, Applicant Parsons Corporation, dated Nov. 18, 2020.

Patent Cooperation Treaty Application No. PCT/US2020/055369, International Search Report and Written Opinion, Applicant Parsons Corporation, dated Feb. 5, 2021.

Mankun, Xu, et al. "A New Time-Frequency Spectrogram Analysis of FH Signals by Image Enhancement and Mathematical Morphology", Image and Graphics, 2007, ICIG 2007, Fourth International Conference on, IEEE, Piscataway, NJ, USA Aug. 1, 2007, pp. 610-615.

Simstad, Erik, et al. "Medical Image Segmentation on GPUs—A Comprehensive Review", Medical Image Analysis, vol. 20, No. 1, Feb. 1, 2015, pp. 1-18.

Chu-Carrol, Jennifer, et al. "A Multi-Strategy and Multi-Source Approach to Question Answering", Jan. 1, 2006, URL: https://www.egr.msu.edu/~jchai/QAPapers/ibm.prager.pdf, pp. 1-8.

Abderrazzak, Samadi, et al. "A Syntactic and Semantic Multi-Agent Based Question Answering System for Collaborative E-Learning", 2018 4th International Converence on Optimization and Applications (ICOA), IEEE, Apr. 26, 2018, pp. 1-4.

Patent Cooperation Treaty Application No. PCT/US2020/055370, International Search Report and Written Opinion, Applicant Parsons Corporation, dated Mar. 12, 2021.

\* cited by examiner

RETROSPECTIVE INTERFEROMETRY DIRECTION FINDING

RELATED APPLICATION

The present application relates to and claims the benefit of priority to U.S. Provisional Patent Application Ser. No. 63/006,571 filed 7 Apr. 2020 which is hereby incorporated by reference in its entirety for all purposes as if fully set forth herein. The present application is further related to commonly assigned U.S. patent application Ser. Nos. 16/996,322, 17/068,110, 17/068,142, and 17/153,223.

BACKGROUND OF THE INVENTION

Field of the Invention

Embodiments of the present invention relate, in general, to direction finding and more particularly to interferometry direction finding using captured and stored IQ data.

Relevant Background

Direction finding (DF), or radio direction finding (RDF), is the measurement of the direction from which a received signal was transmitted. This can refer to radio or other forms of wireless communication, including radar signals detection and monitoring. By combining the direction information from two or more suitably spaced receivers (or a single mobile receiver), the source of a transmission may be located via triangulation. Radio direction finding is used in the navigation of ships and aircraft, to locate emergency transmitters for search and rescue, for tracking wildlife, and to locate illegal or interfering transmitters and the like.

One technique for RDF uses the pseudo-doppler effect. This technique is a phase-based DF method that produces a bearing estimate to the transmitter based on the received signal by measuring the doppler shift induced on the signal by sampling around the elements of a circular array. The original method used a single antenna that physically moved in a circle, but the modern approach uses a multi-antenna circular array with each antenna sampled in succession.

Another principle of DF is correlative interferometry. The basic principle of the correlative interferometer lies in comparing measured phase differences. The different phases in a single signal are obtained from a dual antenna system of known configuration.

In each case, RDF begins with the selection, or detection, of a signal. As the signal transmits, these and other techniques can be used to identify a relative bearing to the signal's source. Unfortunately, once the signal ceases so too does the ability to find its location.

At any point of time and at any location an observation of the radio frequency spectrum includes a plethora of signals. The observed spectrum also includes a vast amount of noise. A need exists to capture and store wideband radio frequency data and from that data and at a later point of time, identify a signal of interest and the location of that signal's transmission. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

Signal bearing information using captured historical radio frequency data is achieved using as few as two receivers and a plurality of commutating antennas. According to one embodiment of the present invention a method for determination signal bearing information using historical data begins with capturing and storing, on a non-transitory storage media, wideband IQ data streams. Such data streams are received at two or more receivers in which a first receiver is coupled to a reference antenna and a second receiver is commutatively coupled to a plurality of commutating antennas. These antennas are configured in a known orientation with respect to the reference antenna.

From the non-transitory storage media, a stream of wideband IQ data is retrieved and directed to the first receiver. A second, identical, stream of wideband IQ data is directed to the second receiver. Both data streams are for a select period of time. The process continues by identifying within each wideband IQ data stream a common signal of interest. This signal of interest includes a center frequency.

The common signal of interest is thereafter synchronously sampled over an acquisition interval by each receiver. The signal is sampled by one receiver at a single antenna, also referred to herein as a reference antenna. Synchronously, the signal is sampled by the second receiver at each of a plurality of commutating antennas. Lastly a bearing to the common signal is identified from observed and measured phase differences.

The method described above can also include, in other embodiments, storing, on the non-transitory storage media, an antenna commutation rate for the plurality of commutating antennas coupled to, and associated with, the second receiver. Another aspect of the invention is that the antenna commutation rate is synchronized with the captured IQ data stream.

During the methodology describe above, each receiver is set to the center frequency and at the same sampling rate. This rate helps define the acquisition interval, as the duration of the acquisition interval is based on a complete cycle of the plurality of antennas at a set commutation rate.

An additional, alternative, step in the methodology described above includes converting the captured wideband IQ data streams into a digital image having a plurality of pixels arranged in a rectilinear grid wherein one or more pixels of the plurality of pixels are positive return pixels and identifying groups of positive return pixels as the common signal of interest.

Similarly, the method can include extracting narrowband IQ signal components from the wideband IQ data streams based on select time and frequency envelope parameters and thereafter storing, on the non-transitory storage media, extracted narrowband IQ signal components. These components can thereafter become the basis or source of the common signal of interest rather than from the wideband IQ data stream.

Synchronizing the wideband IQ data stream captured from each receiver and ascertaining a fixed relative phase difference between the first receiver and the second receiver another feature of the present invention.

In another embodiment of the present invention, a system for determination signal bearing information using historical data includes a first receiver communicatively coupled to a reference antenna configured to capture a first wideband IQ data stream and a second receiver commutatively coupled to a plurality of commutating antennas configured in a known orientation with respect to the reference antenna configured to capture a first wideband IQ data stream. The system further includes a non-transitory storage media configured to store the first wideband IQ data stream received at the first receiver and the second wideband IQ data stream second receiver, and a processor communicatively coupled to a non-transitory computer-readable storage medium that embodies one or more programs of instruction executable by the processor.

One program of instructions direct the processor to retrieve, for a select period of time and from the non-transitory storage media, a first wideband IQ data stream associated with the first receiver and the second wideband IQ data stream associated with the second receiver. The instructions continue by causing the processor to identify within each the wideband IQ data stream a common signal of interest wherein the signal of interest includes a center frequency. Instructions are also included to synchronously sample for an acquisition interval by the first receiver and the second receiver, the common signal in the first wideband IQ data stream and the second wideband IQ data stream. From these samples the instructions cause the processor to measure phase differences in the common signal sampled by the first receiver at the reference antenna and by the second receiver at each of the commutating antennas. These measurements of phase differences enable the processor to identify a bearing to the common signal of interest.

The non-transitory storage media described above, is further configured, according to another embodiment, to store an antenna commutation rate for the plurality of commutating antennas commutatively coupled to the second receiver. Data including the commutation rate and orientation of the antennas enable the processor to determine a bearing to the signal of interest.

In other versions of the present invention the instructions that direct the processor include instructions for synchronizing the antenna commutation rate with the captured second wideband IQ data stream captured from the second receiver as well as instructions for setting the first receiver to the center frequency and at a sampling rate and setting the second receiver to the center frequency and the sampling rate.

The program of instructions, in yet another embodiment, can include instructions for basing a duration of the acquisition interval on a complete cycle of the plurality of antennas at a set commutation rate. The instructions can also direct the processor, in another embodiment, to convert the captured wideband IQ data streams into a digital image having a plurality of pixels arranged in a rectilinear grid wherein one or more pixels of the plurality of pixels are positive return pixels and identifying groups of positive return pixels as the common signal of interest.

The processor can further extract narrowband IQ signal components from the wideband IQ data streams based on select time and frequency envelope parameters and thereafter store, on the non-transitory storage media, extracted narrowband IQ signal components. From these extracted narrowband IQ signals components, the common signal of interest can be selected rather than from the wideband IQ data stream.

Another feature of the invention are instructions directing the processor to synchronize the wideband IQ data stream captured from the first receiver with the wideband IQ data stream captured from the second receiver and to ascertain a fixed relative phase difference between the first receiver and the second receiver. These and other features of the invention are described below in the detailed description.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
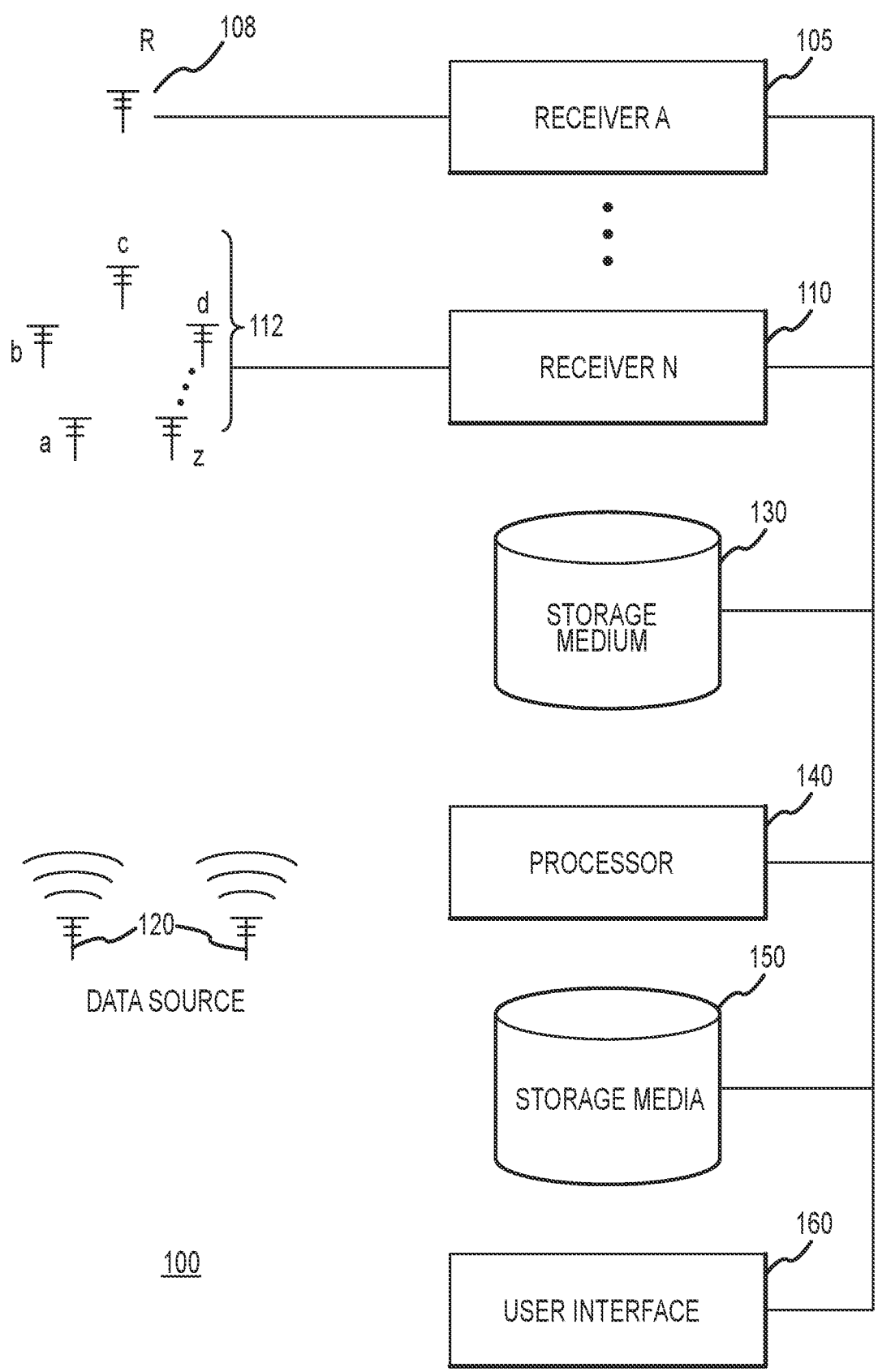
FIG. 1 is a high-level block diagram of a system, according to one embodiment of the present invention, for determining signal bearing from historical wideband IQ data.

The Figures depict embodiments of the present invention for purposes of illustration only. Like numbers refer to like elements throughout. In the figures, the sizes of certain lines, layers, components, elements or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

Wideband Radio Frequency (RF) In-phase and Quadrature modulated (IQ) data is captured and collected simultaneously by two or more receivers and thereafter stored in a non-transitory storage media. At least one of the receivers is commutatively associated with plurality of antennas configured in a known, predetermined orientation. A second receiver, in one embodiment, is associated with a single reference antenna with a known location relative to the commutated antennas. At any point of time during data collection, the antenna which is collecting the data is known and recorded. Note, data is being collected at one of the commutated antennas and at the single reference antenna concurrently. Meta data is also collected and stored.

Data collected through the commutation of antennas and through the reference antenna is synchronized using a common time stamp such as a pulse from a global positioning satellite, is physically piped in, uses an internal reference clock of a SDR/WBT, or the like. The commutation is also synchronized with the receivers so that either receiver can infer the commutated antenna position at any point in time.

After collection, the data is examined to identify a signal of interest. Upon synchronizing the data streams as associated with a now common signal of interest, a phase in the signal can be measured as observed at each commutated antenna and compared to the same signal phase received at the reference antenna associated. Thereafter the phase differences associated with each commutated antenna/reference antenna pair can be compared with the phase difference determined at each other commutated antenna/reference antenna pair. With a known antenna configuration, cycling between each antenna in the plurality of commutated antennas, and with multiple phase difference determinations, an unambiguous bearing to the signal of interest can be determined.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the following terms are understood to have the meaning:

Commutative or commutatively—as relating to, involving, or characterized by substitution, interchange.

Interferometry—a technique in which waves, usually electromagnetic waves, are superimposed, causing the phenomenon of interference, which is used to extract information. Interferometry makes use of the principle of superposition to combine waves in a way that will cause the result of their combination to have some meaningful property that is diagnostic of the original state of the waves. Correlative interferometry consists of comparing measured phase differences of a wave with the phase differences obtained for an antenna system of a known, calculated or determined configuration and at a known, calculated, or determined wave angle.

Acquisition Interval—the time interval over which a signal is observed at each of a plurality of antenna in a commutation cycle.

Bandwidth—A range of frequencies within a given band, in particular that used for transmitting a signal.

DSP (Digital Signal Processing)—the use of digital processing, such as by computers or more specialized digital signal processors, to perform a wide variety of signal processing operations.

Envelope Parameter—Envelope parameters or "signal extents" define a range in which a signal lies in the time and frequency domains. For example, By specifying this signal started at 20 seconds into a recording/stream and ended at 20.5 seconds, within the frequency range of 101 and 101.1 MHz, the extents/parameters needed to fully contain the signal are specified.

FFT (Fast Fourier Transform)—A Digital Signal processing function that is used to convert time series information into a series of frequencies, by arranging the periodicity of the data into a series of bins representing a range of frequencies.

FPGA (Field-Programmable Gate Array)—an integrated circuit designed to be configured by a customer or a designer after manufacturing for a particular set of instructions or functionality.

GPU (Graphics Processing Unit)—is a specialized electronic circuit designed to rapidly manipulate and alter memory to accelerate the creation of images in a frame buffer intended for output to a display device. Their highly parallel structure makes them more efficient than general-purpose central processing units (CPUs) for algorithms that process large blocks of data in parallel.

I/Q Samples/data (In-phase and Quadrature Modulated Samples)—often used in RF applications, form the basis of complex RF signal modulation and demodulation, both in hardware and in software, as well as in complex signal analysis. In electrical engineering, a sinusoid with angle modulation can be decomposed into, or synthesized from, two amplitude-modulated sinusoids that are offset in phase by one-quarter cycle ($\pi/2$ radians). All three functions have the same center frequency. These amplitude modulated sinusoids are known as the in-phase and quadrature components. I is the In-Phase signal component while Q is the Quadrature signal component.

Narrowband—Describes a sampled capture or single signal (or aggregate of subchannels) that occupies a relatively small bandwidth. For the purposes of this document, signals that are less than 20 MHz (e.g. a 10 MHz LTE channel or a 200 kHz FM radio broadcast) would be considered Narrowband.

RF—Radio Frequency—Used for wireless communications, and physical sensing, RF Energy is one form of electromagnetic energy which consists of waves of electric and magnetic energy moving together (radiating) through space, oscillating at various rates. The area where these waves are found is called an electromagnetic field.

RF Spectrum (aka Radio Spectrum)—The part of the electromagnetic spectrum with frequencies from 30 hertz to 300 GHz. Electromagnetic waves in this frequency range, called radio waves, are widely used in modern technology, particularly in telecommunications.

Sampling Rate—A description of how many times per second an RF signal is sampled Signal of Interest (SOI): SOI is the signal or waveform that is of interest to the end user and is being retained as part of the narrowband IQ process or identified a common signal by which to determine a signal bearing using interferometry.

Software Defined Radio—(SDR) a radio communication system where components that have been traditionally implemented in hardware are instead implemented by means of software.

Wideband—Describes a sampled capture or single signal (or aggregate of subchannels) that occupies a large bandwidth. For the purposes of this document, radio captures that are greater than 20 MHz (e.g. a 50 MHz WBT capture) would be considered wideband.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Wideband RF data streams are captured in a raw IQ format using a plurality of commutating antennas associated with one receiver as well as with a reference antenna associated with another receiver. Once stored and synchronized, IQ data can later be retrieved and analyzed. In one embodiment, a common signal is identified within each stored data stream and synchronously sampled over an acquisition interval as captured by each receiver. Using interferometry, phase differences are measured between each commutating antenna associated with one receiver and the reference antenna associated with the other receiver. The resulting phase differences are used to determine a relative bearing to the common signal.

The present invention stores pre-demodulated data allowing a user to identify and select a signal of interest using as few as two channels. With the present invention there is no requirement to know in advance which signal is of interest. The present invention enables a user to look backward after an event or occurrence and determine which signals may be informative and, using software defined radios and collected data, determine the bearing from which that newly identified signal of interest originated. With two more systems of the present invention in place at known locations, Time Distance of Arrival (TDOA) and/or trilateration can be employed to determine a historical point of origin of the signal.

FIG. 1 presents a high-level block diagram of a system for determining direction bearing of a signal from historically collected data. Two or more receivers are communicatively coupled to a plurality of antennas. In the embodiment depicted in FIG. 1, a first receiver 105 is coupled to a single reference antenna 108. A second receiver 110 is coupled to a plurality of commutating antennas 112. In this embodiment the second receiver 110 is coupled to 5 antennae 112. While illustrated in FIG. 1 with two receivers, one of reasonable skill in the relevant art will recognize that the additional receivers can be used successfully to determine a relative bearing of a signal of interest from historical data, in accordance with the disclosure of the present invention herein. Indeed, other embodiments of the present invention may include multiple receivers with different arrays of antennas in which one or more can serve as a reference antenna for the other.

Turning attention back to FIG. 1, a system 100 for determining a relative bearing to a signal source 120 based on historical data includes two or more receivers 105, 110 non-transitory storage media 130, a processor 140, a storage medium 150 and a user interface 160. In one embodiment of the present invention, a plurality of antennas 112 are placed in a known configuration and shared with a single receiver 110. Another receiver 105, in one embodiment, is associated with a single antenna 108 serving as a reference antenna. Both the first and second receiver 105, 110 receive and store wideband RF IQ data on the non-transitory storage media. The second receiver 110 in this embodiment is commutatively switches between several antennas 112 positioned in a known configuration. In one embodiment two wideband independently tunable receivers or transceivers capable of up to 50 MHz of bandwidth from at least 50 MHz to 6 GHz are employed. Other embodiments can employ receivers with more or less capability, depending on mission requirements.

In one embodiment of the present invention each receiver is phase relatable to the other receiver, not phase coherent. Phase coherent receivers use a common local oscillator so that the tuning circuit is using the same reference signal. Phase relatable receivers use different local oscillators. The present invention recognizes differences in the local oscillator output and relates them to each other as if they were phase coherent.

An object of the present invention is to determine phase differences in received signals between a reference antenna 108 and a plurality of antenna 112 associated with a second receiver 110. Various geometric configurations that drive favorable results are contemplated by the present invention. While the depictions herein include 5 antenna positioned at the vertexes of a pentagon with the reference antenna located in the geometric center of the pentagon, other configurations are equally suitable. The minimal requirement is that the configuration of the antennas 112 of the second receiver 110 and each antenna's position relative to the reference antenna 108 is known. Indeed, in one embodiment of the present invention a compass is embedded in the system to provide accurate relative bearings and positions of the configured antennas.

As wideband RF IQ data is received, either through the reference antenna 108 associated with the first receiver 105 or through the commutating antennas 112 associated with the second receiver 110, the data streams are stored in a non-transitory storage media 130. Various types of non-transitory storage media suitable to store wideband RF IQ data are well known to one of reasonable skill in the relevant art.

Along with the collected data streams, metadata regarding the data is collected and stored. Metadata such as time stamps, commutating schedules, commutating rate, etc. are associate with each data stream to enable the data to be synchronized.

A processor 140, capable of executing instructions embodied as code, stored on non-transitory storage medium 150, directs the collections and storage of information as well as subsequent processing. In one embodiment the non-transitory storage media 130 housing the collected wideband RF IQ data streams and the non-transitory storage medium 150 housing instructions embodied as code executable by the processer are distinct, while in other embodiments the are share the same physical space yet separate the data and instructions logically. In other direction-finding applications a processor 140 would have many phase-coherent channels so antennas could be independently connected to independent channels. In one embodiment of the present invention a first channel is assigned to a fixed reference antenna, while the secondary channel is commutated in strict time though a sequence of five (a plurality of) antennas. This commutation is not used for Doppler processing as in some other DF antenna heads, but as independent phase interferometer baselines.

Lastly, the system includes a user interface 160 to enable users to control the collection and storage of data as well as presentation of information based on post-collection processing.

One aspect of the present invention is the ability to capture raw wideband RF IQ data, later identify a signal of interest and then retrospectively determine the bearing from which that common signal of interest originated. To do so a comparison of signal phase is conducted as the signal arrives at different antenna. In one embodiment the invention uses two receivers to examine the same signal synchronously.

Figure 2:
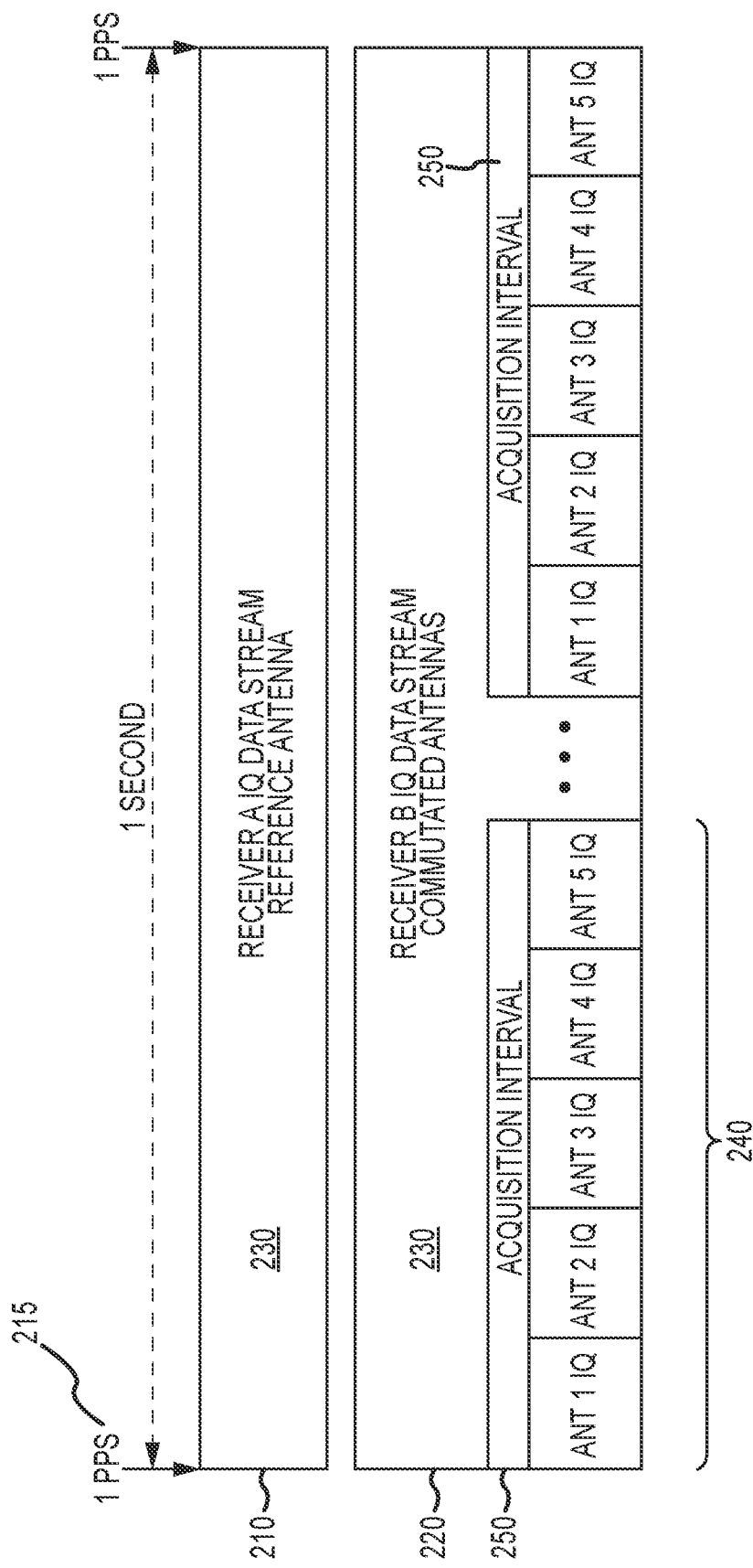
FIG. 2 is a graphical depiction of a synchronized pulse associated with a receiver having a single reference antenna and a receiver commutated between a plurality of antennas, according to one embodiment of the present invention.

FIG. 2 is a graphical depiction of a portion of a data stream received by two receivers, according to one embodiment of the present invention. The graphic depicts 1 second of a data stream that has been observed, collected and stored by both receiver A 210 and receiver B 220. During data collections, a 1 Pulse Per Second (PPS) signal 215 is used, in one embodiment, to synchronize the antenna commutation cycle and the receivers. When the PPS is received, the antenna head associated with the second receiver 220 starts its commutation sequence at Antenna 1. The sampled RF IQ data is timestamped relative to the pulse, so it is possible to recover the knowledge of which antenna is commutated by simply inspecting the timestamps. The top portion of the diagram illustrates that receiver A 210, having one antenna, experiencing a steady stream of data 230. Receiver B 220, however, collects data 230 from 5 antennas sequentially. Only one of the antennas 240 is connected to receiver B 220 at any one time. As the invention cycles between the commutated antenna 240, RF IQ data 230 is collected and stored. One cycle of all of the antennas represents an acquisition interval 250. In this depiction, at least two acquisition intervals 250 have taken place in a single second. The acquisition or commutation rate is defined as a complete set of commutation data, which is ⅕ the acquisition interval in this embodiment since there are five antennas. One of reasonable skill in the relevant art will also recognize that the selection of 5 commutated antenna, as shown in this embodiment, is an optimization decision based on a desired analysis window.

The acquisition interval (the time to complete a cycle of the commutated antennas) is a finite period of time. For the direction-finding analysis to be accurate the common signal of interest during that period must be stable, unchanged, so that the information from each commutated antenna (as compared to the reference antennas) can be correlated forming an unambiguous result. If the number of antennas in increased or if the dwell time on each antenna is increased, thereby increasing the overall acquisition interval, the chance that the signal may change during the acquisition interval increases. However more antennas and/or a longer dwell time at an antenna may yield more accurate results. Thus, the invention may be optimized for certain environments or frequencies, and while the present examples depict 5 antennas in a pentagon like orientation, one of reasonable skill in the art will recognize that other configuration and timing are possible, and indeed contemplated, without departing from the spirit and scope of the present invention.

Figure 3A:
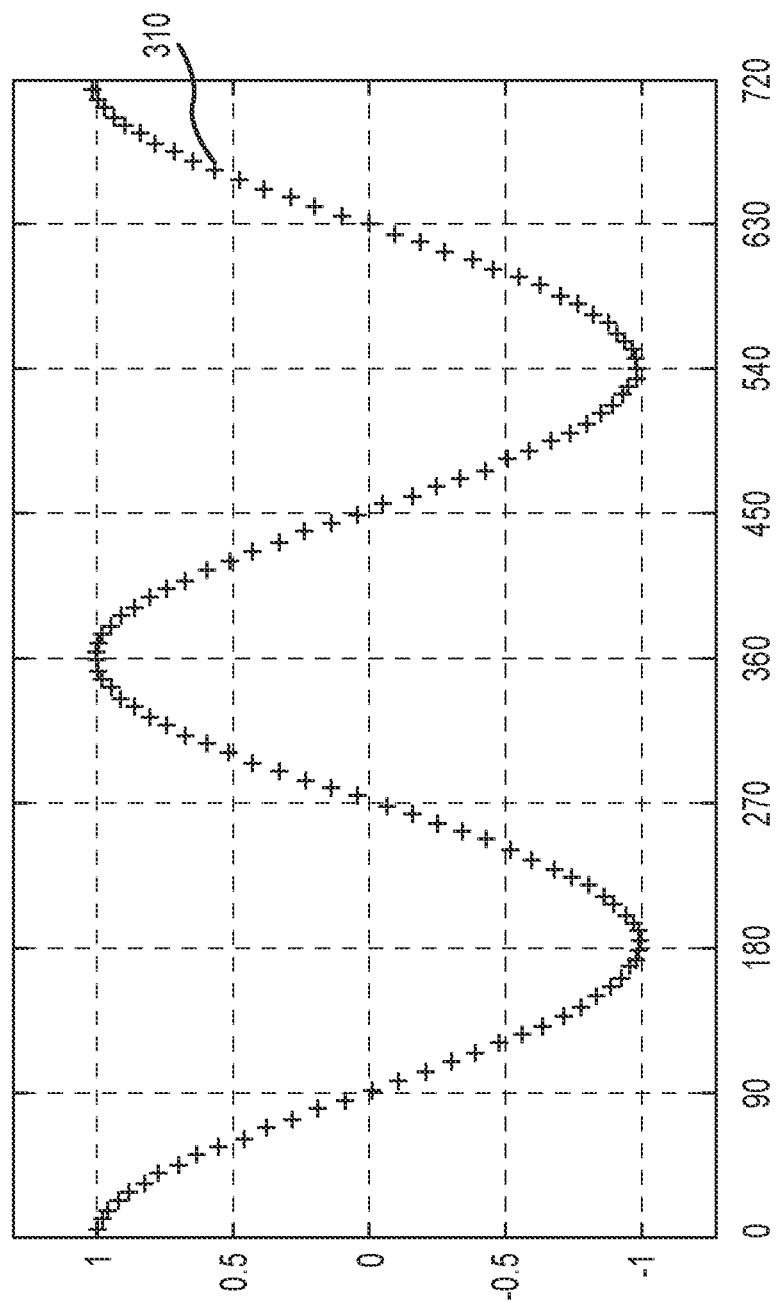
FIGS. 3A and 3B present an RF signal in a two- and three-dimensional rendering, respectively, as would be received by commutated antennas according to one embodiment of the present invention.
Figure 3B:
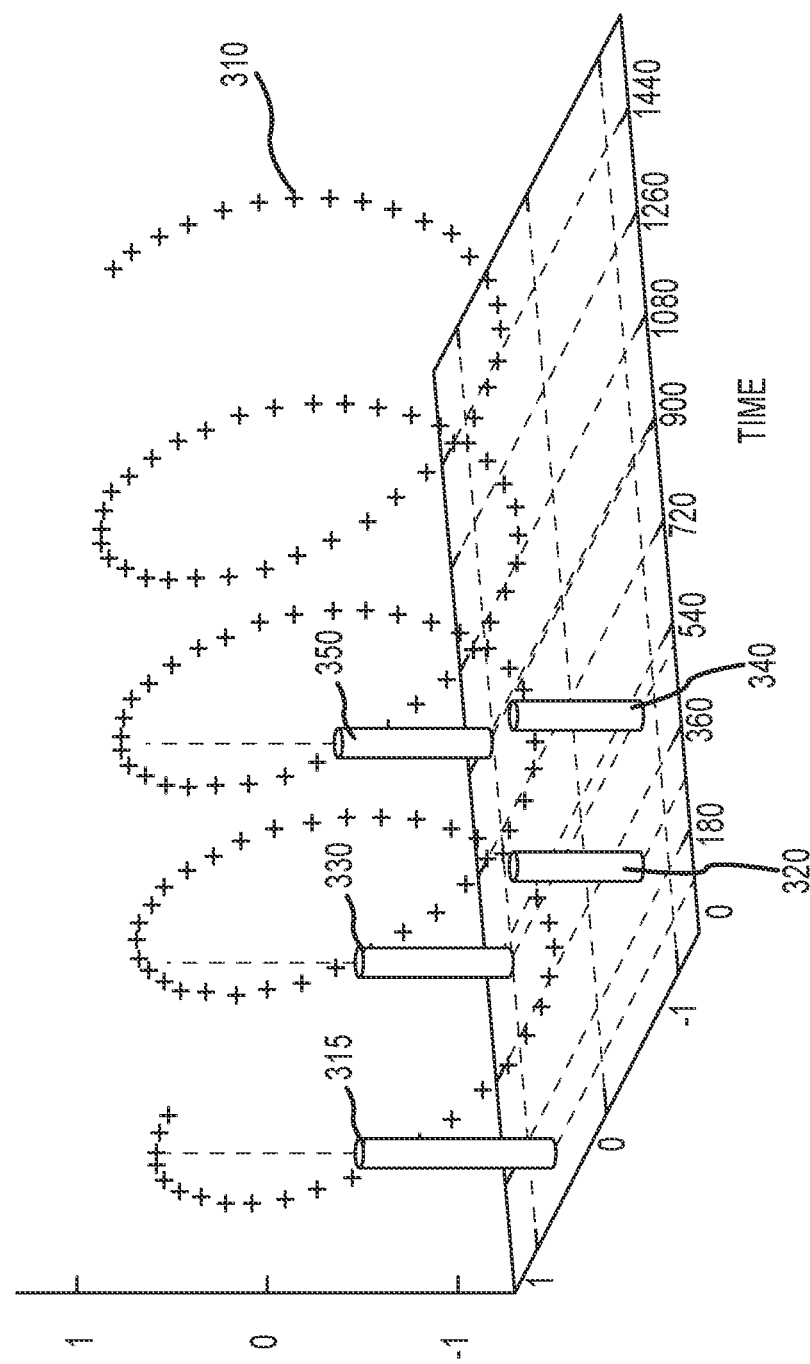

The present invention uses phase interferometry to determine a relative bearing of a signal source. To better understand this process and how it is applied to the present invention consider the following example as illustrated in FIGS. 3A and 3B and applied in FIG. 3C. If two antennas spaced a certain distance apart hear (receive) the same signal at the same time, there are, in two-dimensional space, two possible directions from which the signal originated. Those directions would follow a line perpendicular to, and bisecting, a baseline drawn between the two antennas. If the same two antennas received the same signal, but at a different time, and knowing that RF transmissions travel at the speed of light, one can determine the direction from which the signal originated.

Given the speed that RF signals travel, to make this approach feasible the distances between receivers must be sufficient to measure a time difference. In a small constellation of antennas such as proposed in the present invention, the distance between antennas does not warrant measuring such a minimal time difference in signal reception. However, each signal also includes a phase characteristic.

RF signals include a distinct phase characteristic. The same signal received at the same time would have the same phase characteristic. However, the same signal received at a different point in time would have a different phase characteristic. The phase angle of a signal can be readily measured. FIG. 3A is a sinusoidal signal 310 in two dimensions. FIG. 3B depicts the same signal 310 in three dimensions. The spiral effect is representative of the phase of a constant amplitude, constant frequency signal 310. FIG. 3B also includes several antennas 315, 320, 330, 340, 350 which due to their location receive the same signal at different points of time and each experiences a different signal phase. The present invention uses the difference in phase to determine a difference in arrival time which can be thereafter converted into a bearing.

Figure 3C:
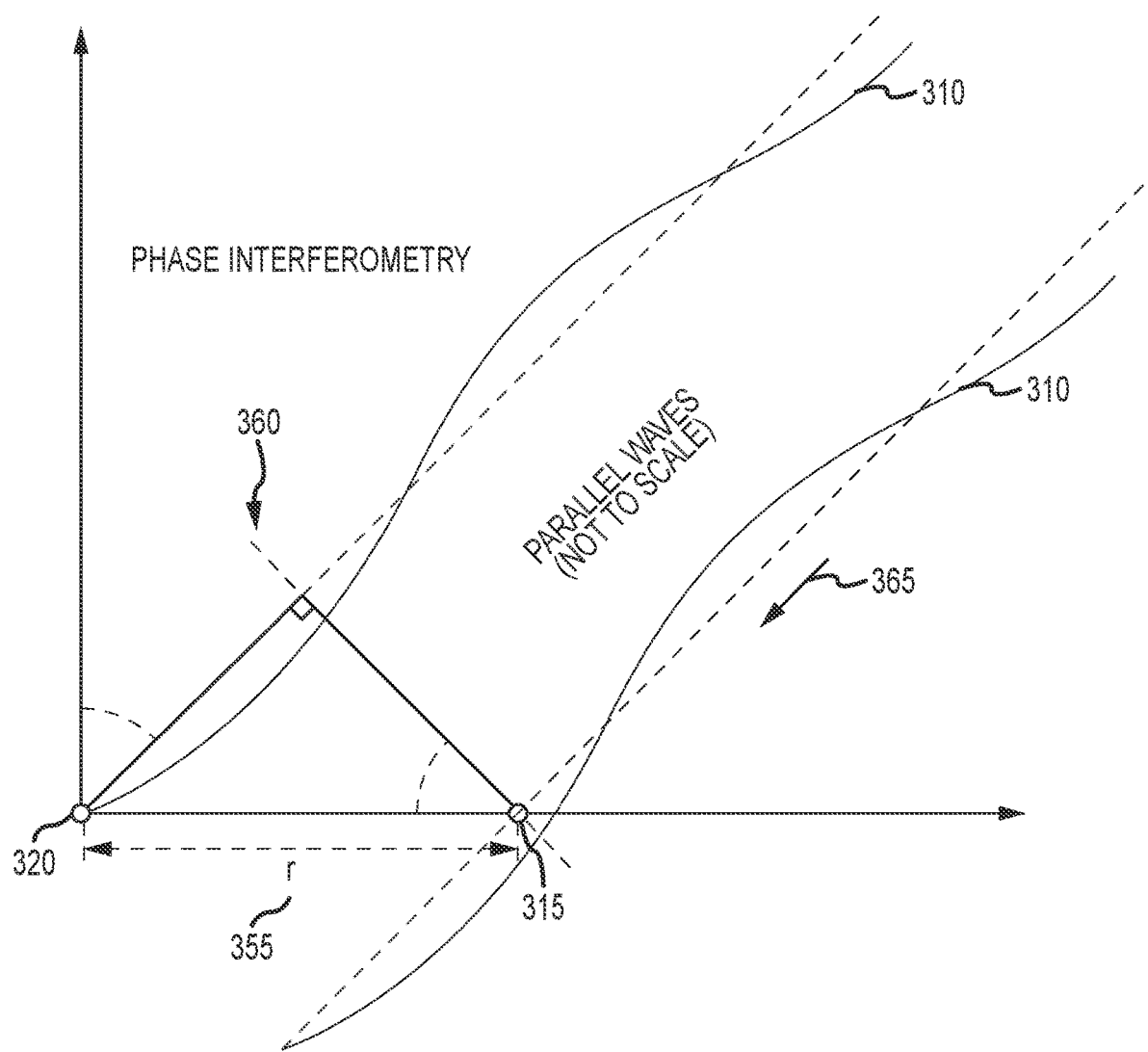
FIG. 3C is a graphical depiction of phase interferometry as used in one or more embodiments of the present invention to determine a signal bearing from historical wideband IQ data.

FIG. 3C is a depiction of a representative phase difference calculation based on two antenna 315, 320 separated by a distance r 355 interacting with a mono-pulse wavefront 360. The wavefront 360 is represented by the line perpendicular to the propagation direction 365. Phase eclipsing ambiguities in the relative bearing are determined by antenna spacing, r 355 and wavelength. As other possible angle solutions are examined among different antenna pairs, ambiguities diminish. Antenna configuration and spacing can be adjusted based on desired degrees of accuracy and likely frequency encounters.

Recall that the receivers of the present invention are set (related) to the same center frequency and sampling rate and samples from stored data gathered by both receivers are synchronously examined at a baseband, as they share the same reference clock. Since the signals do not share the same local oscillator they are not phase coherent at the RF frequency(ies) of interest. Once tuned however, the receivers are phase-stable relative to one another fixing the phase difference. The present invention accounts for an arbitrary unknown phase difference between the first and second receiver. And since each commutated antennas associated with the second receiver has the same arbitrary phase offset it can be removed from the calculations.

In one embodiment of the present invention data collected by the second receiver is done so with short baselines. The baseline is the distance from each commutating antenna associated with the second receiver and the reference antenna associated with the first receiver. In one embodiment the baselines are less than half of a wavelength for frequencies under 2 GHz. While the design and distance between antenna is arbitrary, one embodiment of the present invention provides a compact, singular device to collect wideband RF IQ data from which a directional bearing can be obtained from historical data.

One feature of the present invention is that the arbitrary phase difference between the first and second receivers is eliminated by differencing each of the five received phase differences with all other interferometer baselines thereby producing 10 virtual baselines.

Figure 4A:
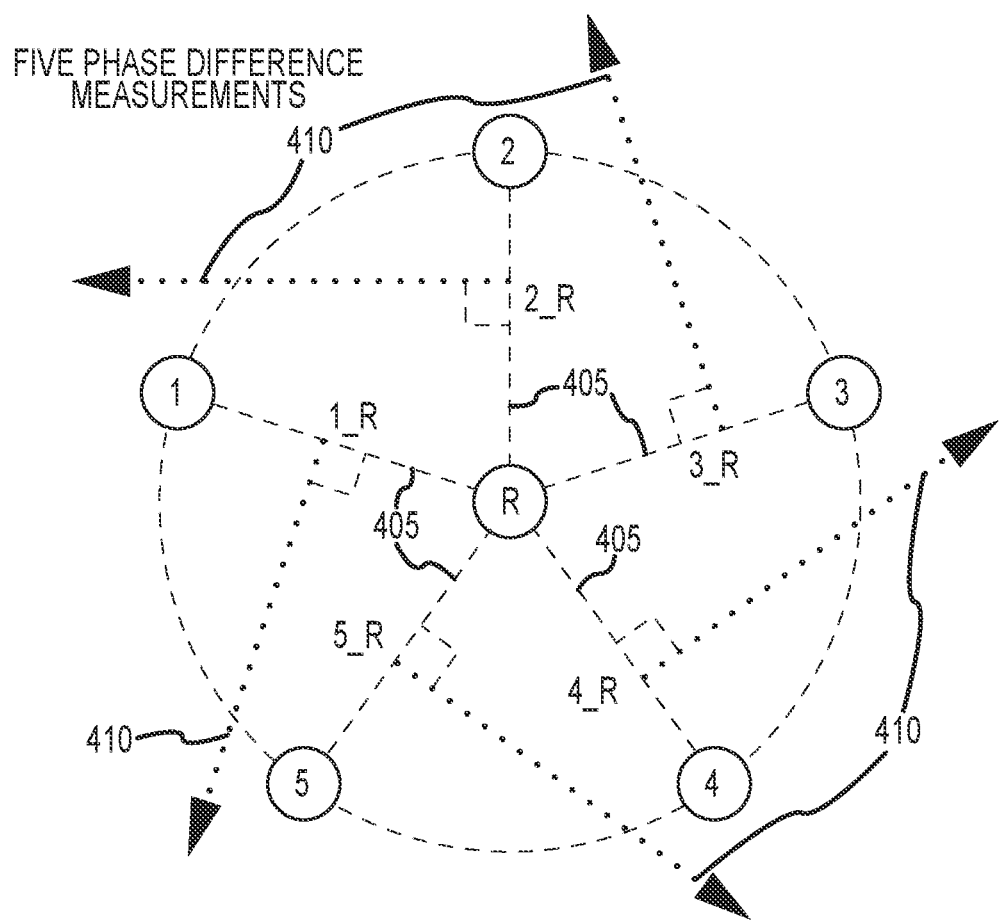
FIG. 4A is one embodiment of an antenna configuration showing a plurality of commutated antennas and a single reference antenna with associated baselines, according to the present invention.
Figure 4B:
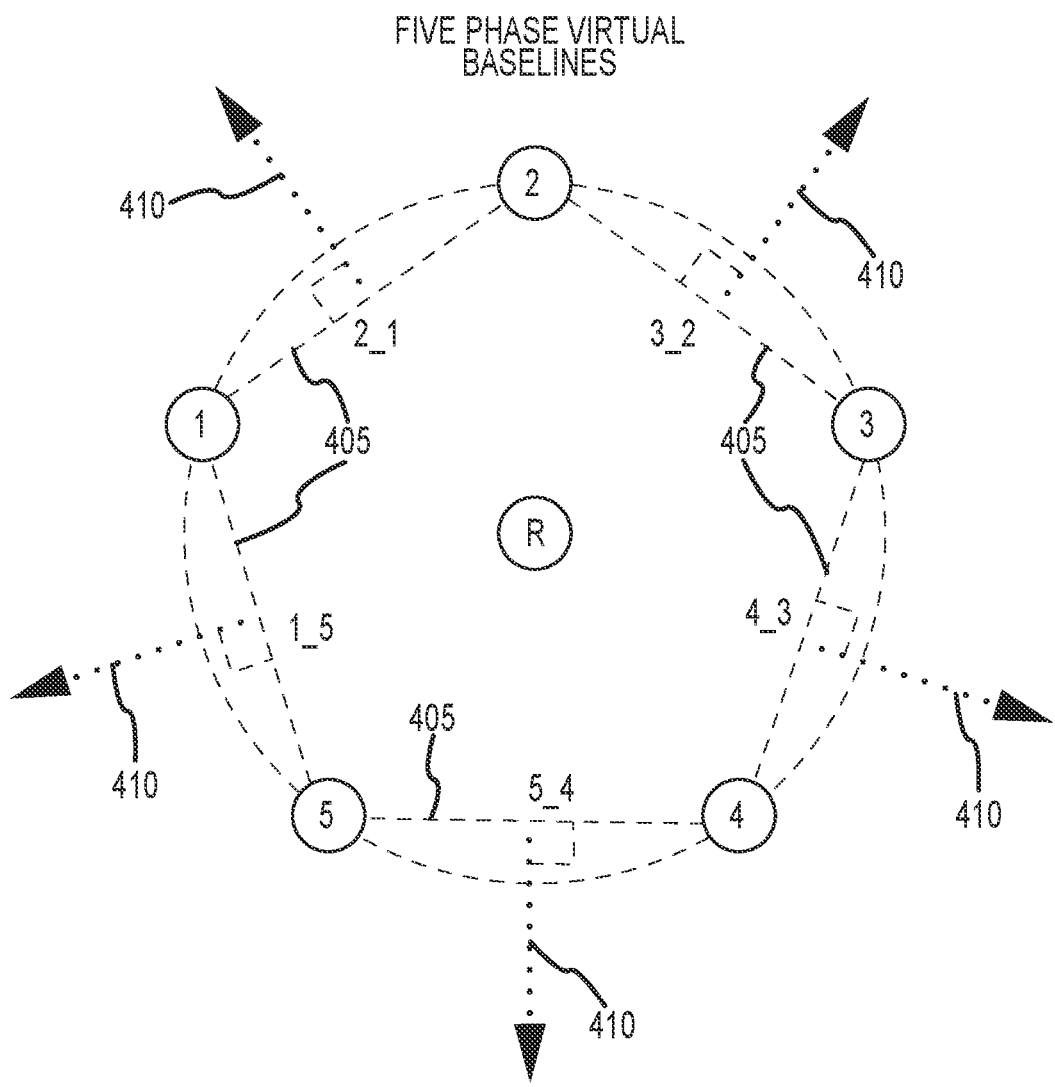
FIG. 4B identifies a first set of virtual baselines between each of the plurality of antennas first shown in FIG. 4A, according to one embodiment of the present invention.
Figure 4C:
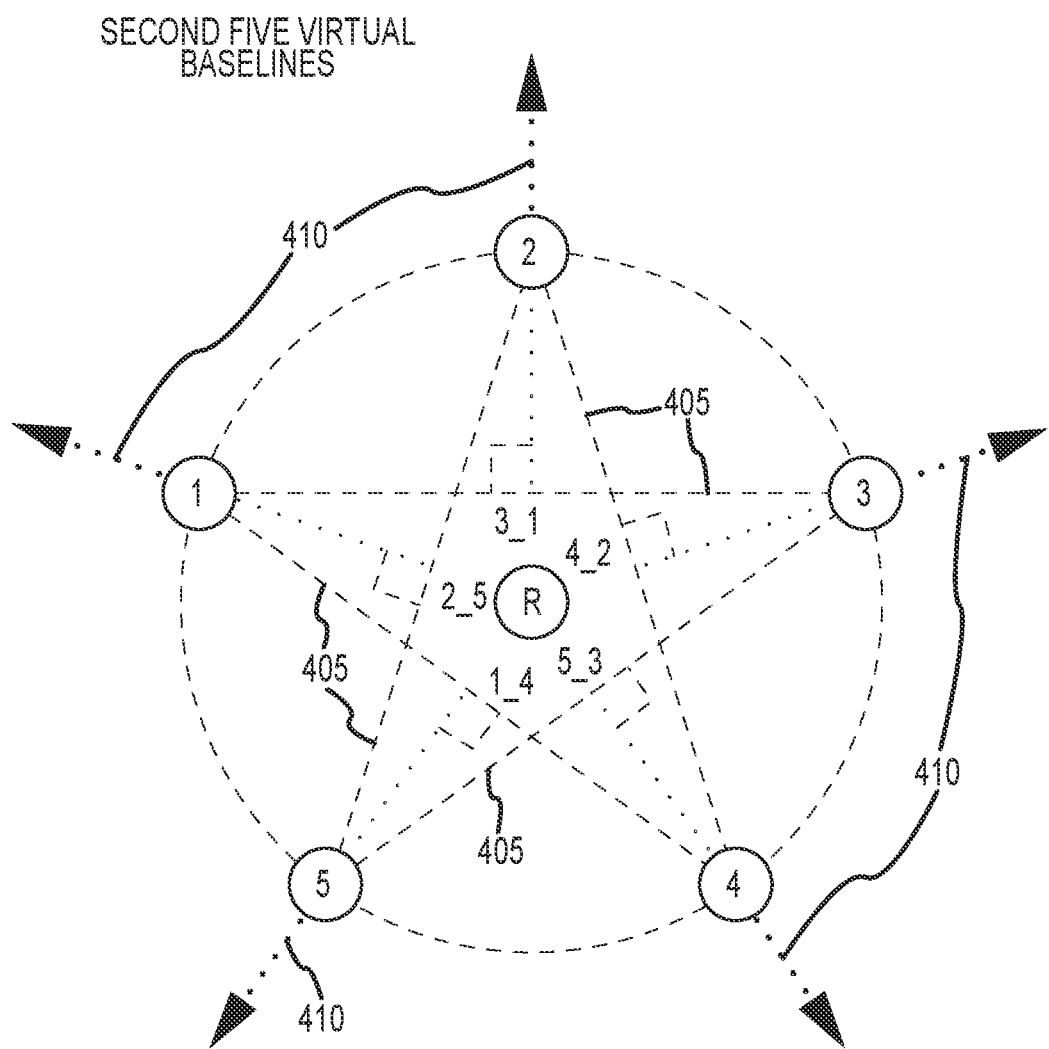
FIG. 4C identifies a second set of virtual baselines between each of the plurality of antennas first shown in FIG. 4A, according to one embodiment of the present invention.

FIGS. 4A-C depict, for an antenna constellation of five antennas, a series of base line phase differences between each commutating antenna and the reference antenna and thereafter 10 virtual baselines to reduce ambiguities. This is mathematically equivalent to removing the reference antenna from consideration and using all combinations of interferometer baselines formed by the only five commutating antennas.

With reference to FIG. 4A, interferometer baselines 405 are shown in a dashed line, while the zero-degree normal lines 410 (perpendicular lines) are shown in dot-dash lines. The ten virtual baselines 405 are used as an ensemble to find the best Line of Bearing from each commutated antenna determination. Note that having two different baseline lengths (in groups of five) makes the algorithm more robust. The measured phase differences can be computed for narrowband signals in the time domain with simple complex conjugate multiplication of the commutating and reference antenna IQ samples. For multiple narrowband or wideband signals, complex FFTs of each antenna's IQ samples followed by complex conjugate multiplication of the complex frequency domain bins produces phase differences at many center frequencies simultaneously.

Recall that a received signal at each antenna will have a frequency, amplitude, and phase associated with it. The phase, which varies from 0° to 360°, is not an absolute value (unlike the amplitude and frequency), but is relative to a known, or unknown, reference. Typically, this reference is a local oscillator of the same frequency or another received signal. In this case that reference is in relation to the received signal from another antenna (the reference antenna) allocated a known distance from the first antenna.

There is a relationship between the angel of arrival of the signal and the phase difference between two antennas as previously described. This phase difference between two antennas separated by a known distance will generate two possible directions since there are two locations around the antenna array that can produce a given phase difference. By sampling the phase difference of other antenna pairs, there is sufficient information to determine an unambiguous angle of arrival of the signal.

Figure 5:
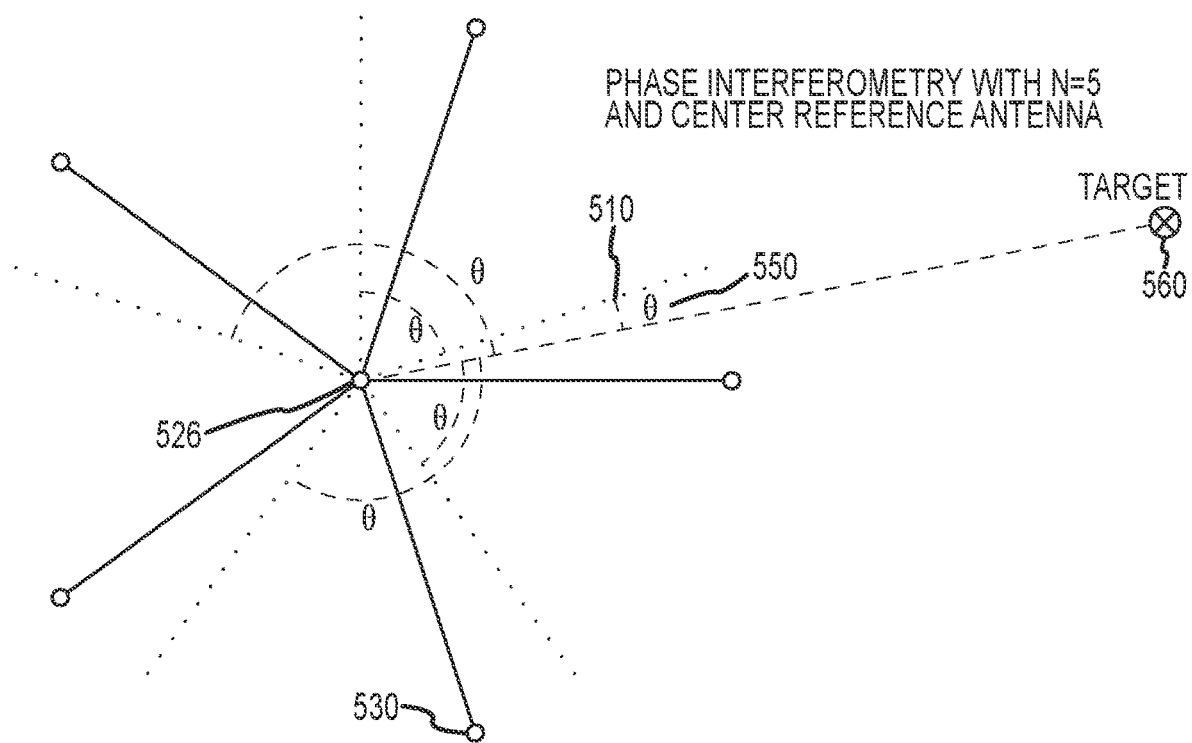
FIG. 5 shows determining a signal bearing from historical wideband IQ data streams, according to one embodiment of the present invention.

FIG. 5 presents an overlay of 5 different angles of arrival as found using interferometry from phase differences identified at each commutating antenna and the reference antenna pair. The bearing off the zero degree normal line for each antenna pair is shown. For example, the zero degree bearing line 510 for antenna pair R 520 and antenna I 530 is θ degrees 550 from the source 560. Once a signal of interest has been identified and the data streams synchronized, information regarding the signal as received by each antenna can be retrieved and used to identify a relative angle of bearing for each antenna pair. Each antenna pair will produce two solutions with various degrees of ambiguity. One solution from each pair will coalesce into a single unambiguous result. Moreover, other features of the signal such as amplitude can also be used to refine the results.

Recall that each antenna in the antenna array as associated with the second receiver receives the data stream, and thus the signal of interest, at slightly different times during the acquisition interval. These precise time differences must be synchronized with the reference antenna data stream to ensure the phase differences are measured accurately. The phase difference will be different at each of the commutating antenna as will be the ambiguity in the relative direction determination. The aggregate determination however is unambiguous with certainty being relatively consistent.

Figure 6:
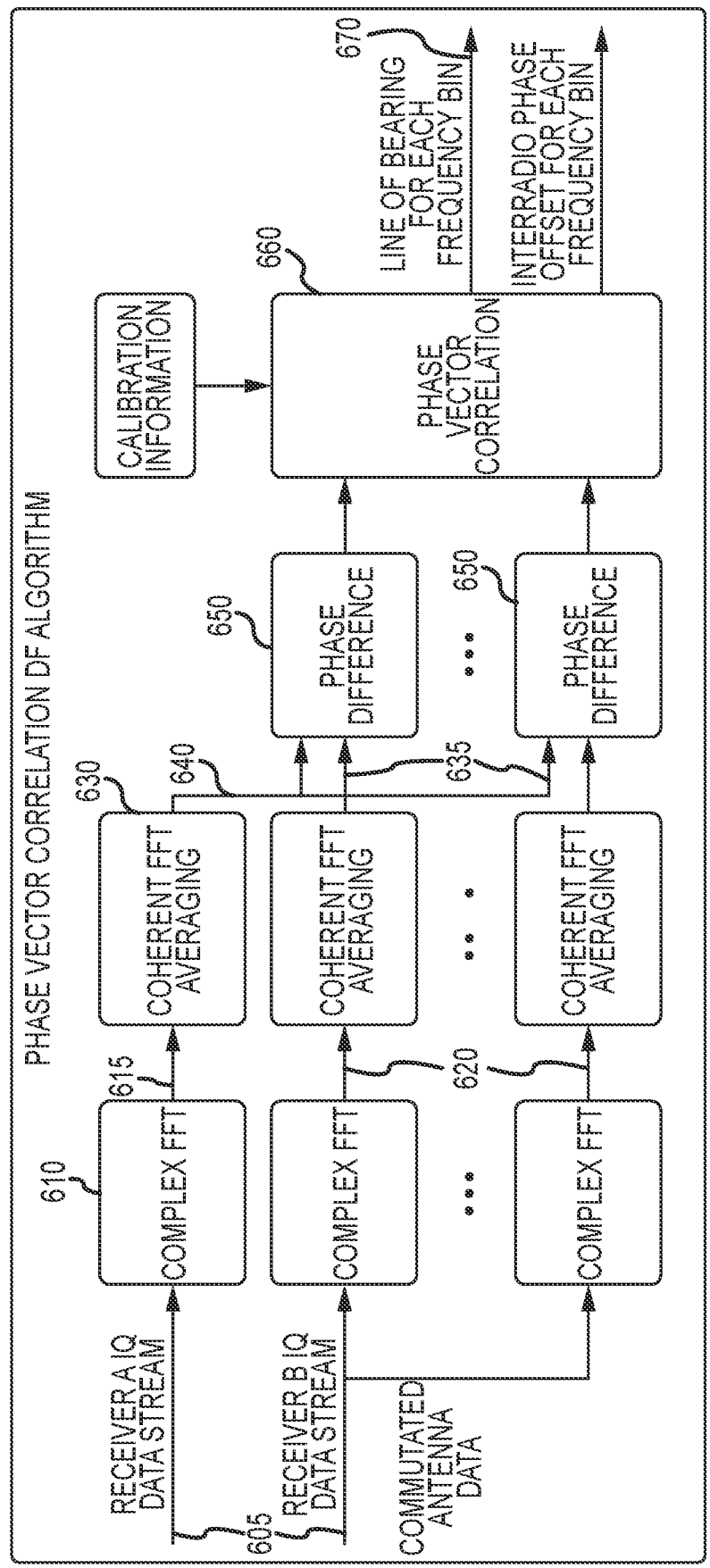
FIG. 6 is a high-level block diagram for phase vector correlation using a historical wideband IQ data, two receivers and a plurality of commutating antennas according to one embodiments of the present invention.

FIG. 6 is process flow block diagram depicting correlation of phase vectors to determine a line of bearing of a signal source. As data streams 605 are retrieved from the non-transitory storage media a signal of interest is identified and transformed from its original IQ format to a coherent signal using a complex FFT 610. Recall that the data originally collected is wideband RF IQ data. The complex FFT bins IQ data into a phase spectrum. For example, complex FFT can carve the data into 1024 frequency bins.

The resulting coherent signals for the first receiver 615, associated with the reference antenna, and the signal observed at each commutate antenna 620, are averaged 630. Each averaged coherent commuted antenna signal 635 is compared with the averaged reference coherent signal 640 to determine a phase difference vector 650. The vectors are thereafter correlated 660 to identify an unambiguous line of bearing 670 to the signal source.

As an illustration of the present invention consider the following example. Certain events or circumstances carry a likelihood that an occurrence may happen that later warrants detailed scrutiny. A politically charged demonstration, or a public event in which privacy and security is a concern warrants the installation of collection devices to capture and store wideband RF IQ data. Yet prior to the event and even at the event there is no indication of what signals to look for or analyze. For the purpose of this example assume a large political event has been schedule in which a faction has threatened to disrupt the experience. As a precaution several RF IQ data collection devices are installed at known locations. Each device comprises two receivers. A first receiver is associated with, and communicatively coupled to, a single antenna. Wideband RF IQ data collected by this antenna is stored on a non-transitory storage media for the duration of the event. Also associated with the device is a plurality of antennas configured in a known predetermined orientation and commutatively coupled to a second receiver. The distances between each antenna as well the distance from each antenna to the single antenna of the other receiver is known and recorded. The second receiver commutatively cycles between each antenna at a known rate and schedule while collecting the same wideband RF IQ data as by the first receiver.

During the event an explosion occurs. Forensics determine that the explosion was triggered by a short-range transmission of an RF signal of a certain frequency. While cameras of the even recorded the environment, the vast majority of attendees possess a RF device capable of sending the triggering transmission. The present invention enables investigators to turn back the clock and examine the collected wideband RF IQ data to identify the signal or signals of interest that match the RF frequency that triggered the explosive device. Eliminating the other data, the invention synchronizes the common signal(s) of interest on the two data streams and examines the phase angle of the signal as it was recorded on each commutated antenna and the reference antenna. For each recording of the signal on a commutated antenna there is a corresponding recording of the signal on the reference antenna. As the antenna are not collocated, the phase angle of each recording will be slightly different. A difference in phase angle is measured at each antenna pair. Each phase difference produces an ambiguous bearing to the source of transmission. By correlating bearings from each antenna pair an unambiguous bearing to the source of the common signal of interest can be determined. With multiple devices in place a location of the signal source can be determined and cross referenced with video and other data.

One aspect of the present invention is identifying, from stored wideband RF IQ data streams, a signal of interest. In another embodiment of the present invention, data is gathered from the non-transitory storage media and converted into a digital image or snapshot covering a select time interval. This image is represented by a rectilinear grid wherein the grid includes a first and second axis, with each axis having a plurality of axis units. The units define a grid of pixels.

Each pixel in each axis unit of one axis is examined in parallel using, in one embodiment, a graphic processor unit (GPU) to determine whether any pixels exceed a predefined power threshold. Those pixels that exceed the threshold are identified as positive return pixels. By collecting within each axis unit collections of positive return pixels based on a first axis epsilon, groups can be formed. Adjacent groups of positive return pixels are assembled by merging the axis units based on a second axis epsilon. Positive return pixels grouped together according to the first axis epsilon and the second axis epsilon are classified and reported as a signal.

The present invention uses image segmentation as described above to identify a signal of interest or significant cluster of data. Image segmentation is the process of partitioning a digital image into multiple segments (sets of pixels, also known as image objects). The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics.

The process of image segmentation, as described herein, crafts a set of segments that collectively covers the entire image, and/or forms a set of contours extracted from the image. Each of the pixels in a region are similar with respect to some characteristic or computed property, such as color, intensity, or texture. Adjacent regions are significantly different with respect to the same characteristic(s). Region boundaries and edges are closely related, since there is often a sharp adjustment in intensity at the region boundaries. The present invention, in one embodiment, uses image segmentation to identify common signals of interest in the recorded data streams. In other embodiments, signals of interest are first identified and then presented as possible signals of interest. Note that once a signal is identified, the determination of bearing using interferometry must be accomplished using stored IQ data and not a graphical image. Thus, the process of image segmentation is an intermediary independent step, in one embodiment.

As previously described, wideband RF IQ data is captured by two or more receives wherein at least one receiver is commutatively associated with a plurality of antennas of a known, predetermined configuration. In another version of the present invention narrowband IQ data is extracted and stored prior to identification of a signal of interest.

Capturing, extracting and storing narrowband IQ data for later processing enables timely and efficient analysis. As wideband capture of RF IQ data includes noise and non-signal elements, one embodiment of the present invention detects, extracts and stores narrowband IQ signals for later assessment. By transforming a high-volume wideband data stream from each receiver to a collection of smaller narrowband signals with greatly reduced storage and on-board processing requirements, the present invention facilitates the capability to analyze signals of interest in an otherwise denied environment. This aspect of the present invention is a tradeoff from a more robust wideband capture to a more efficient narrowband capture and storage. Each provides signal data characteristics and metadata sufficient to be used for later bearing determination.

The ability to sense important signals of interest in a crowded spectrum has become more and more difficult. As spectrum density grows, understanding what is in your environment at any given time and where those signals are coming from has become increasingly complex. Background characterization and spectrum monitoring requirements have driven the need for complete and precise coverage of the spectrum and accomplishing this with traditional RF acquisition systems can be prohibitively expensive and inefficient. Capturing, extracting and storing narrowband IQ data for later processing enables timely and efficient analysis. As wideband capture of RF information includes noise and non-signal the present invention detects and extracts IQ signals for later assessment. Transforming a high-volume data stream to a collection of smaller narrowband signals with greatly reduced storage and on-board processing requirements facilitates the capability to analyze signals of interest in an otherwise denied environment. Either option, wideband or narrowband captures, can be employed with the present invention.

Direction finding of the present invention can also be combined with Time Distance of Arrival (TDOA) and trilateration. Trilateration is a technique that determines position based on distance information from uniquely identifiable ranging radios. Other systems can determine the origin of a signal using techniques that measure signal differences—differences in received signal strength (RSS), signal angle of arrival (AoA), signal time of arrival (ToA) or signal time difference of arrival (TDoA). By having multiple direction-finding devices collecting data simultaneously and independently determining a relative bearing, a determination can be made as to the point of origin of the signal source. For example, if an array of three direction finding systems of the present invention were installed in a region of interest, each would independently collect wideband RF IQ data and each would independently be able to determine a relative bearing to a select signal. The identified common signal of interest originated from a signal source yet arrived at each location at different times. The differences in the arrival times can be used to identify an area from which the signal originated and combined with the relative bearings of another device a location can be determined.

Figure 7:
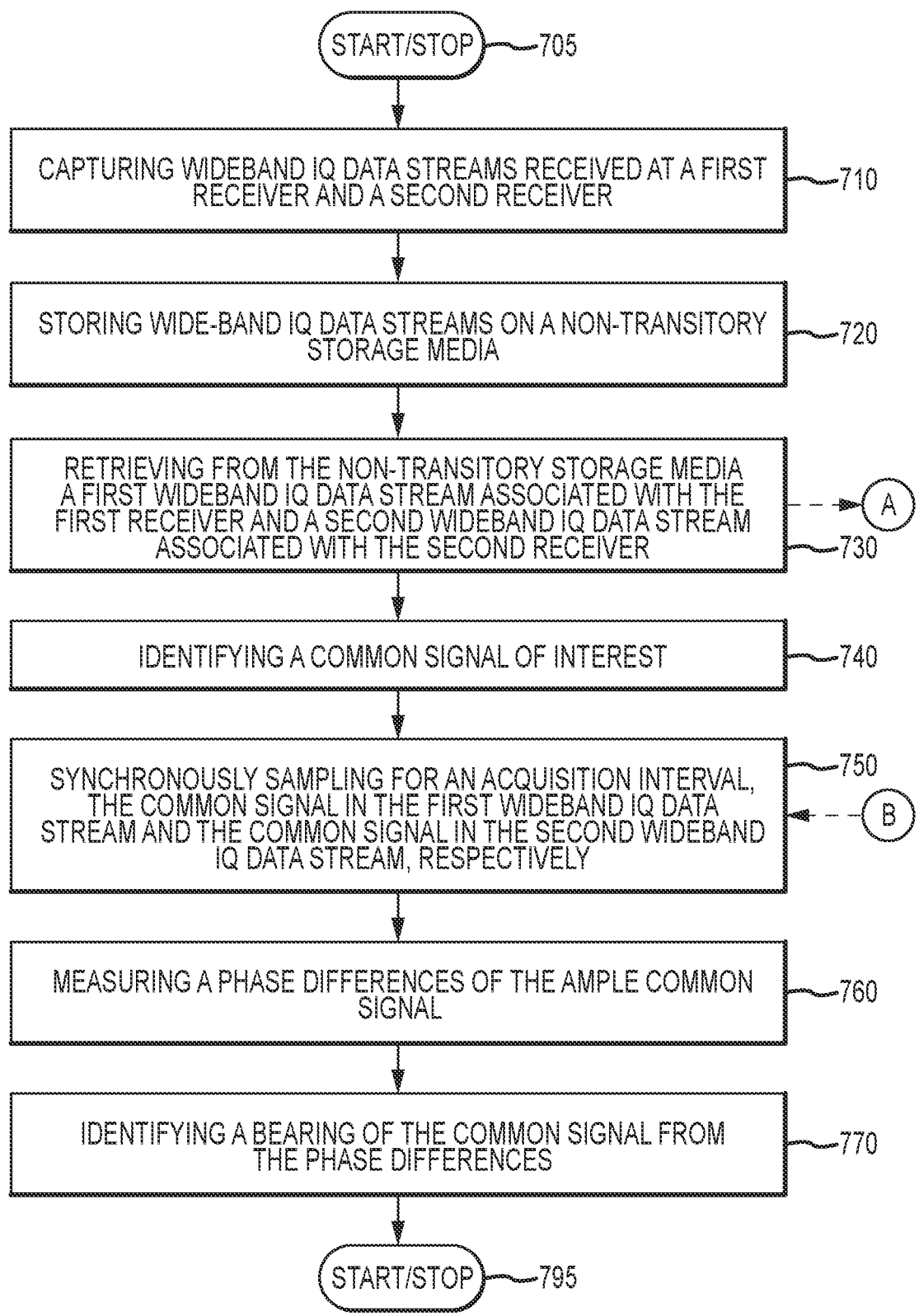
FIG. 7 is a flowchart of one method embodiment of the present invention for determining a signal bearing from historical wideband IQ data streams.

The process by which to do so starts with the capture and collection of data. FIG. 7 is a flowchart of one methodology of the present invention for identifying a signal bearing using historical data. The process begins 705 with capturing 710 of wideband IQ data streams from at least two receivers. In one version of the present invention one receiver is associated with a single reference antenna while the other receiver is associated with a plurality of antennas having a known preconfigured orientation. The second receiver commutatively accesses each antenna from a period of time to collect a wideband RF IQ data stream.

Once captured the wideband RF IQ data streams are stored 720 on a non-transitory storage media along with metadata providing information with respect to its capture. For example, the antenna sequencing, commutative rate, acquisition interval, antenna orientation with respect to each receiver, and the like are stored along with the data streams.

At a later time, the respective data streams are retrieved 730 for examination. The data streams are synchronized and from each data stream a common signal of interest is identified 740. Knowing the commutative rate associated with the second receiver, a sample of the signal of interest is synchronously examined 750 over an acquisition interval. During each acquisition interval a phase difference is measured 760 between each of the commutated antenna associated with the second receiver and the reference antenna associated with the first receiver.

From each phase difference comparison, a relative bearing is determined with each determination including a certain degree of ambiguity. By correlating each relative bearing determination for the plurality of commutating antenna, an unambiguous relative bearing to the common signal of interest can be determined 770, ending 795 the process.

Figure 8:
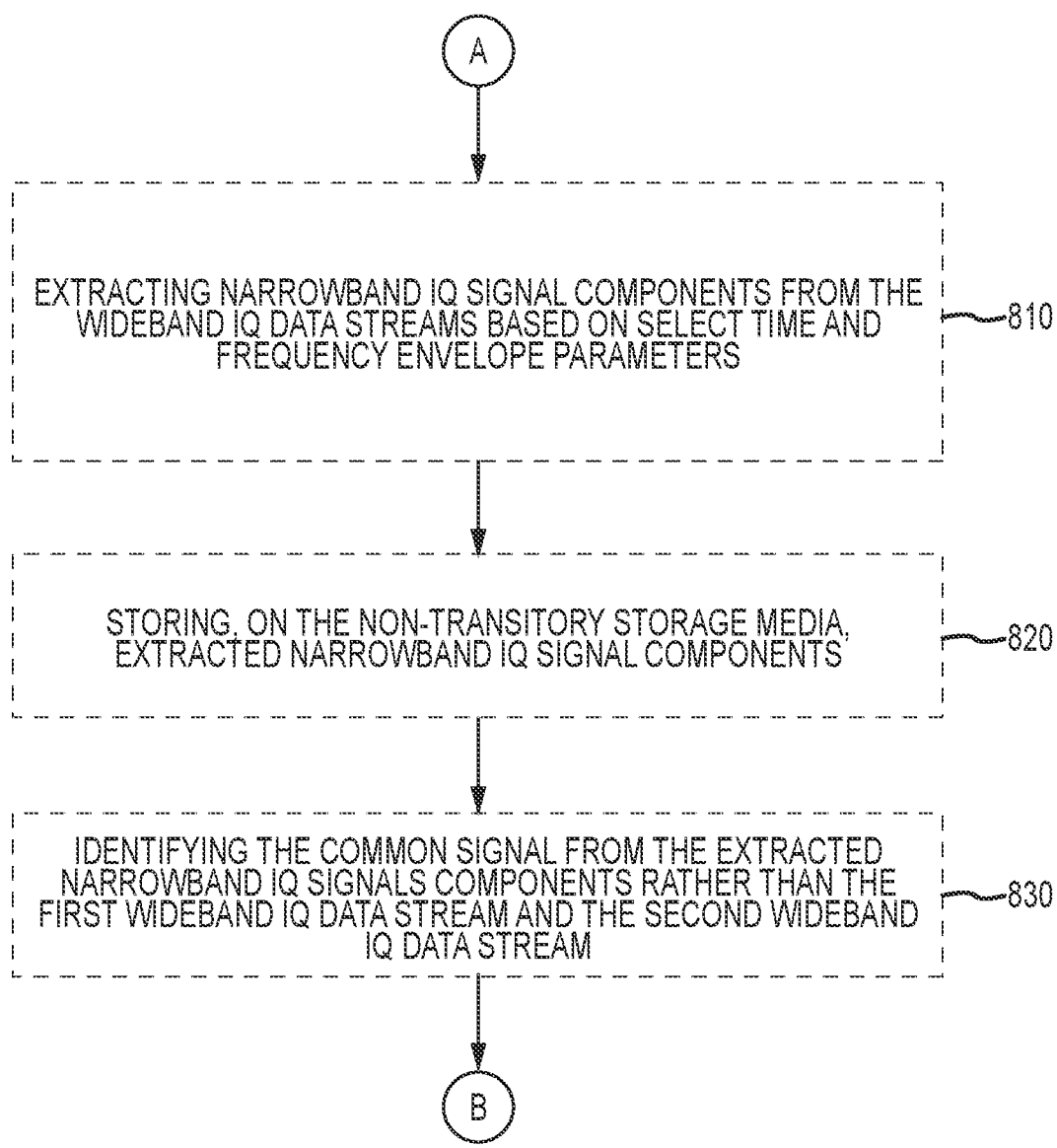
FIG. 8 is a flowchart of one method embodiment of the present invention for identifying signals using a graphical image of historical data and for extracting narrowband IQ data for later determination of a signal bearing.
Figure 9:
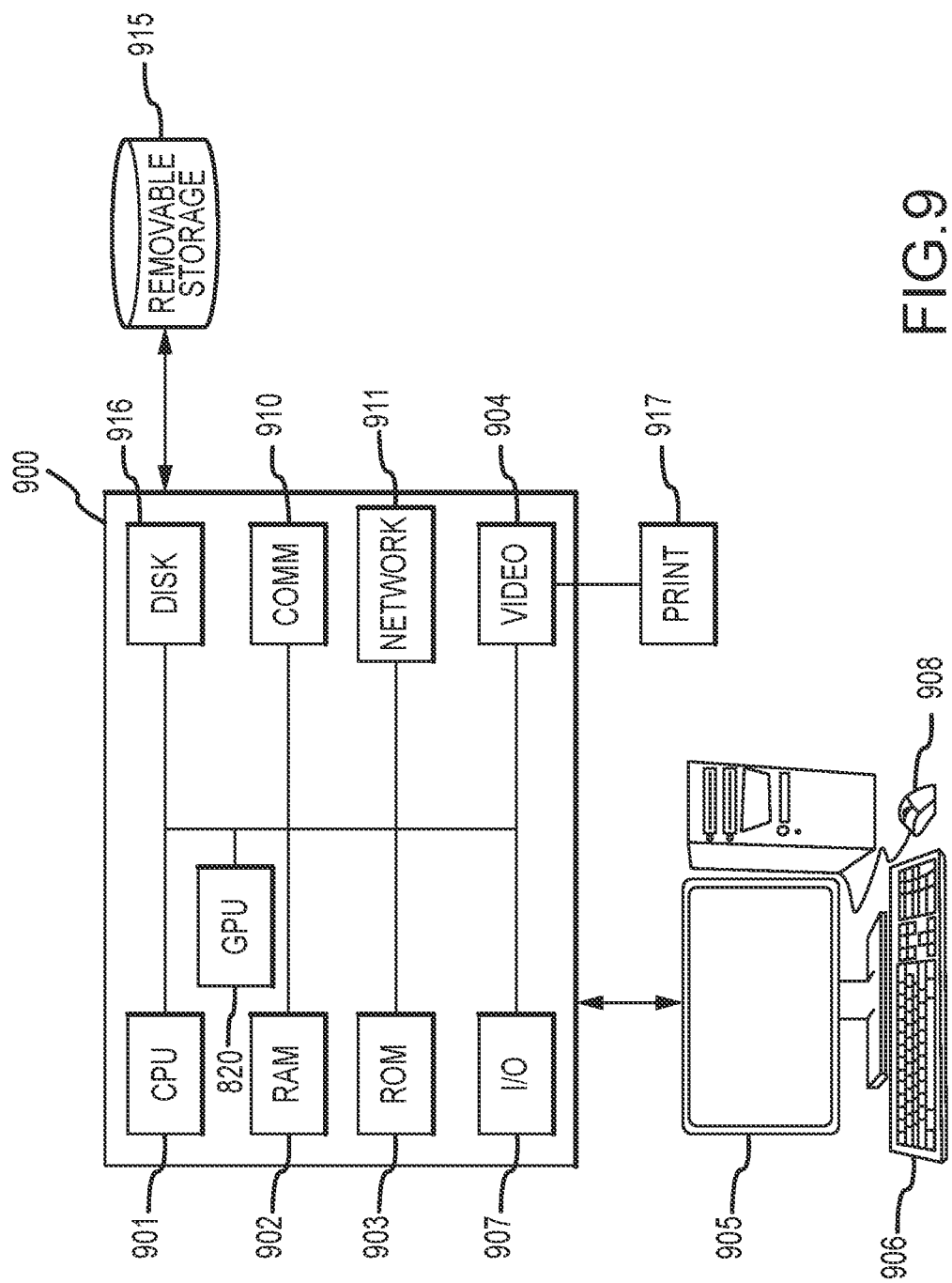
FIG. 9 is a block diagram of a computer system suitable for implementation of one or more embodiments of retrospective interferometry.

The process of the present invention can be streamlined by first extracting 810 narrowband IQ signals from the wideband data as illustrated in FIG. 8. Using select time and frequency envelope parameters the storage 820 requirements for the data streams can be minimized without jeopardizing the ability to determine a direction from which select signals originate. From this select grouping of narrowband IQ signal components the present invention can sample phase differences over an acquisition interval and determine 830 a relative bearing consistent with the process for wideband IQ data.

The flowcharts described above depict examples of the methodology which may be used to determine a relative bearing to a signal source from historical IQ data streams. It will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Wideband RF IQ data is collected at two or more receivers and stored or later analysis. At least one antenna associated with a first receiver serves as a reference antenna while a plurality of other antennas are commutatively coupled to a second receiver. While the figures herein depict a signal reference antenna associate with the first receiver and five antennas associated with the second, the configuration is arbitrary and one of reasonable skill in the art will recognize that the configuration may vary without departing from the scope of the present invention.

Indeed, in another embodiment an array of antennas can be coupled to both receivers and commutatively selected so that at any one-time RF IQ data is received at two different known antenna locations. Upon examination the phase difference between two antenna can be determined but the antenna pairs may differ throughout the sequence.

Upon reading this disclosure, those of skill in the art will appreciate still additional alternative structural and functional designs for a system and a process for determination of relative bearing using historical RF IQ data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention.

In a preferred embodiment, the present invention can be implemented in software and/or firmware. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

One of reasonable skill will also recognize that portions of the present invention may be implemented on a computing system, such as a personal computer (PC), server, a laptop computer, a notebook computer, a handheld or pocket computer, and/or a server computer. FIG. 5 is a very general block diagram of a computer system in which software-implemented processes of the present invention may be embodied. As shown, system 900 comprises a central processing unit(s) (CPU) or processor(s) 901 coupled to a random-access memory (RAM) 902, a graphics processor unit(s) (GPU) 920, a read-only memory (ROM) 903, a keyboard or user interface 906, a display or video adapter 904 connected to a display device 905, a removable (mass) storage device 915 (e.g., floppy disk, CD-ROM, CD-R, CD-RW, DVD, or the like), a fixed (mass) storage device 916 (e.g., hard disk), a communication (COMM) port(s) or interface(s) 910, and a network interface card (NIC) or controller 911 (e.g., Ethernet). Although not shown separately, a real time system clock is included with the system 900, in a conventional manner.

CPU 901 comprises a suitable processor for implementing the present invention. The CPU 901 communicates with other components of the system via a bi-directional system bus 920 (including any necessary input/output (I/O) controller 907 circuitry and other "glue" logic). The bus, which includes address lines for addressing system memory, provides data transfer between and among the various components. Random-access memory 902 serves as the working memory for the CPU 901. The read-only memory (ROM) 903 contains the basic input/output system code (BIOS)—a set of low-level routines in the ROM that application programs and the operating systems can use to interact with the hardware, including reading characters from the keyboard, outputting characters to printers, and so forth.

Mass storage devices 915, 916 provide persistent storage on fixed and removable media, such as magnetic, optical, or magnetic-optical storage systems, flash memory, or any other available mass storage technology. The mass storage may be shared on a network, or it may be a dedicated mass storage. As shown in FIG. 5, fixed storage 916 stores a body of program and data for directing operation of the computer system, including an operating system, user application programs, driver and other support files, as well as other data files of all sorts. Typically, the fixed storage 916 serves as the main hard disk for the system.

In basic operation, program logic (including that which implements methodology of the present invention described below) is loaded from the removable storage 915 or fixed storage 916 into the main (RAM) memory 902, for execution by the CPU 901. During operation of the program logic, the system 900 accepts user input from a keyboard and pointing device 906, as well as speech-based input from a voice recognition system (not shown). The user interface 906 permits selection of application programs, entry of keyboard-based input or data, and selection and manipulation of individual data objects displayed on the screen or display device 905. Likewise, the pointing device 908, such as a mouse, track ball, pen device, or the like, permits selection and manipulation of objects on the display device. In this manner, these input devices support manual user input for any process running on the system.

The computer system 900 displays text and/or graphic images and other data on the display device 905. The video adapter 904, which is interposed between the display 905 and the system's bus, drives the display device 905. The video adapter 904, which includes video memory accessible to the CPU b, provides circuitry that converts pixel data stored in the video memory to a raster signal suitable for use by a cathode ray tube (CRT) raster or liquid crystal display (LCD) monitor. A hard copy of the displayed information, or other information within the system 900, may be obtained from the printer 917, or other output device.

The system itself communicates with other devices (e.g., other computers) via the network interface card (NIC) 911 connected to a network (e.g., Ethernet network, Bluetooth wireless network, or the like). The system 900 may also communicate with local occasionally connected devices (e.g., serial cable-linked devices) via the communication (COMM) interface 910, which may include a RS-232 serial port, a Universal Serial Bus (USB) interface, or the like. Devices that will be commonly connected locally to the interface 910 include laptop computers, handheld organizers, digital cameras, and the like.

While there have been described above the principles of the present invention in conjunction with a system and associated methodology for determination of a signal bearing using historical wideband RF IQ data, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

What is claimed is:

1. A method for determination of signal bearing information, the method comprising:

capturing and storing on a non-transitory storage media wideband IQ data streams received at a first receiver and a second receiver wherein the first receiver is coupled to a reference antenna and the second receiver is commutatively coupled to a plurality of commutating antennas configured in a known orientation with respect to the reference antenna;

retrieving from the non-transitory storage media a first wideband IQ data stream associated with the first receiver and a second wideband IQ data stream associated with the second receiver for a select period of time;

synchronizing the wideband IQ data stream captured from the first receiver and wideband IQ data stream captured from the second receiver;

identifying within each the first wideband IQ data stream and the second wideband IQ data stream a common signal of interest wherein the signal of interest includes a center frequency;

synchronously sampling for an acquisition interval the common signal in the first wideband IQ data stream and the common signal in the second wideband IQ data stream as received by the first receiver and the second receiver, respectively;

measuring a phase differences of the common signal sampled by the first receiver at the reference antenna and the second receiver at each of the commutating antennas; and identifying a bearing of the common signal from the phase differences.

2. The method for determination of signal bearing information according to claim 1, further comprising storing, on the non-transitory storage media, an antenna commutation rate for the plurality of commutating antennas commutatively coupled to the second receiver.

3. The method for determination of signal bearing information according to claim 2, further comprising synchronizing the antenna commutation rate with the captured second wideband IQ data stream captured from the second receiver.

4. The method for determination of signal bearing information according to claim 1, wherein identifying includes setting the first receiver to the center frequency and at a sampling rate and setting the second receiver to the center frequency and the sampling rate.

5. The method for determination of signal bearing information according to claim 1, wherein a duration of the acquisition interval is based on a complete cycle of the plurality of antennas at a set commutation rate.

6. The method for determination of signal bearing information according to claim 1, further comprising converting the captured wideband IQ data streams into a digital image having a plurality of pixels arranged in a rectilinear grid wherein one or more pixels of the plurality of pixels are positive return pixels and identifying groups of positive return pixels as the common signal of interest.

7. The method for determination of signal bearing information according to claim 1, further comprising extracting narrowband IQ signal components from the wideband IQ data streams based on select time and frequency envelope parameters and thereafter storing, on the non-transitory storage media, extracted narrowband IQ signal components.

8. The method for determination of signal bearing information according to claim 7, further comprising identifying the common signal from the extracted narrowband IQ signals components rather than the first wideband IQ data stream and the second wideband IQ data stream.

9. The method for determination of signal bearing information according to claim 1, further comprising ascertaining a fixed relative phase difference between the first receiver and the second receiver.

10. A system for determination of signal bearing information, the system comprising:

a first receiver communicatively coupled to a reference antenna configured to capture a first wideband IQ data stream;

a second receiver commutatively coupled to a plurality of commutating antennas configured in a known orientation with respect to the reference antenna configured to capture a first wideband IQ data stream;

a non-transitory storage media configured to store the first wideband IQ data stream received at the first receiver and the second wideband IQ data stream second receiver; and a processor communicatively coupled to a non-transitory computer-readable storage medium tangibly embodying a program of instructions, executable by the processor, for retrieving from the non-transitory storage media a first wideband IQ data stream associated with the first receiver and the second wideband IQ data stream associated with the second receiver for a select period of time, synchronizing the first IQ data stream captured from the first receiver and the second wideband IQ data stream captured from the second receiver, identifying within each the first wideband IQ data stream and the second wideband IQ data stream a common signal of interest wherein the signal of interest includes a center frequency, synchronously sampling for an acquisition interval by the first receiver and the second receiver, the common signal in the first wideband IQ data stream and the common signal in the second wideband IQ data stream, respectively, measuring a phase difference in the common signal sampled by the first receiver at the reference antenna and the common signal sampled by the second receiver at each of the commutating antennas, and identifying, from the phase differences, a bearing to the common signal of interest.

11. The system for determination of signal bearing information according to claim 10, wherein the non-transitory storage media configured to store an antenna commutation rate for the plurality of commutating antennas commutatively coupled to the second receiver.

12. The system for determination of signal bearing information according to claim 11, wherein the program of instructions further includes instructions for synchronizing the antenna commutation rate with the captured second wideband IQ data stream captured from the second receiver.

13. The system for determination of signal bearing information according to claim 10, wherein the program of instructions for identifying further includes instructions for setting the first receiver to the center frequency and at a sampling rate and setting the second receiver to the center frequency and the sampling rate.

14. The system for determination of signal bearing information according to claim 10, wherein the program of instructions further includes instructions for basing a duration of the acquisition interval on a complete cycle of the plurality of antennas at a set commutation rate.

15. The system for determination of signal bearing information according to claim 10, wherein the program of instructions further includes instructions for converting the captured wideband IQ data streams into a digital image having a plurality of pixels arranged in a rectilinear grid wherein one or more pixels of the plurality of pixels are positive return pixels and identifying groups of positive return pixels as the common signal of interest.

16. The system for determination of signal bearing information according to claim 10, wherein the program of instructions further includes instructions for extracting narrowband IQ signal components from the wideband IQ data streams based on select time and frequency envelope parameters and thereafter storing, on the non-transitory storage media, extracted narrowband IQ signal components.

17. The system for determination of signal bearing information according to claim 16, wherein the program of instructions further includes instructions for identifying the common signal from the extracted narrowband IQ signals components rather than the first wideband IQ data stream and the second wideband IQ data stream.

18. The system for determination of signal bearing information according to claim 10, wherein the program of instructions further includes instructions for ascertaining a fixed relative phase difference between the first receiver and the second receiver.

\* \* \* \* \*